United States Patent Office 3,657,143
Patented Apr. 18, 1972

3,657,143
MANUFACTURE OF MINUTE CAPSULES, EN MASSE, AND DEWATERING THEIR WALLS
Victor A. Crainich, Jr., Dayton, Ohio, assignor to The National Cash Register Company, Dayton, Ohio
No Drawing. Filed Feb. 2, 1970, Ser. No. 7,980
Int. Cl. B01j 13/02; B44d 1/02; C08h 19/02
U.S. Cl. 252—316
5 Claims

ABSTRACT OF THE DISCLOSURE

A method is disclosed for preparing minute capsules, en masse, in a liquid manufacturing vehicle, said capsules having walls comprising a complex of gelatin and derivatives of sulfosuccinates or organic phosphate esters. Further, as an additional embodiment, a method is disclosed for treating water-swollen gelatin-containing capsule walls with derivatives of sulfosuccinates or organic phosphate esters in order to reduce the water concentration therein.

BACKGROUND OF THE INVENTION

This invention pertains to en masse preparation of minute capsules by a method of liquid-liquid phase separation from solution (coacervation) wherein an aqueous gelatin solution may be treated with derivatives of sulfosuccinates or organic phosphate esters to cause separation of a liquid capsule-wall-forming material from the aqueous manufacturing vehicle in equilibrium therewith. The invention also relates to a method for treating the walls of already-formed capsules, which walls comprise gelatin and are in a water-swollen state, with derivatives of sulfosuccinates or organic phosphate esters in an aqueous slurry; said treatment having the effect of altering certain physical characteristics of the capsules by reducing the water concentration (i.e., "dewatering") in the water-swollen capsule walls.

The use of water-soluble sulfonates and water-soluble organic derivatives of sulfonic acid is known in the art of hardening of dried gelatin films. Also known is the use of sulfonates and organic derivatives of sulfonates and phosphates in the formation of solid water-insoluble gelatin complex precipitates in the photography art. Unitil now, however, the manufacture of coacervates by use of sulfosuccinates and by use of organic derivatives of phosphate esters and use of such coacervates in making capsules has not been known. Processes of capsule manufacture utilizing the phenomenon of phase separation require the existence of a so-called coacervate liquid which wets and wraps around intended capsule core entities dispersed in an encapsulation system. It has been found that certain water-soluble sulfosuccinates and organic phosphate esters can be used, with careful control of process parameters, to yield a gelatin-sulfosuccinate or a gelatin-phosphate ester coacervate liquid useful to manufacture the walls of capsules. Capsules with such walls can retain either liquid or solid, substantially water-insoluble, core entities or internal phase materials that may be provided for that purpose. The phase-separated product resulting from the chemical reaction between gelatin and the subject sulfosuccinate and phosphate ester materials is a pH-reversible, liquid coacervate material as opposed to the irreversibly cross-linked reaction product of other non-polymeric capsule-wall-forming co-reactants such as formaldehyde with gelatin, as disclosed in U.S. Pat. No. 2,800,457, which issued July 23, 1957, on application of Barrett K. Green and Lowell Schleicher. Moreover, the subject coacervate material exists reversibly with respect to changes in concentration of reactants and other system parameters.

Use of the reaction between gelatin and certain sulfosuccinate and organic phosphate ester materials to yield capsule walls, exhibits several benefits over other, well-known, methods practiced at the present time. The following are two such benefits: (1) The process, although critical with respect to some values, is simpler to perform and is therefore more economical; and (2) The process parameters and the reaction characteristics of the subject reaction allow encapsulation at a system solids concentration higher than previously utilized, thus admitting of a substantial decrease in processing cost by increasing capsule production per unit manufacturing volume.

An additional utility of the reaction between sulfosuccinates and gelatin or organic phosphate esters and gelatin, either in gelatin-containing coacervates or not, resides in the "dewatering" of capsule walls which have previously been formed by conventional encapsulation techniques but which remain in a water-swollen state dispersed in an aqueous slurry; care being exercised not to leave the coacervate state. In this case, "dewatering" is a term used to denote a substantial decrease in the water content of a water-swollen capsule wall as it exists in an aqueous environment. Stated in different terms, a dewatered capsule wall is a capsule wall in which the previously water-swollen capsule wall material has been shrunken by the exclusion of water, so that, while it is not dry, it displaces much less volume than a capsule wall which has not been so treated. Such dewatering of capsule walls is useful in many fields of capsule manufacture and use, for example: (1) When capsules are to be dried and isolated to yield individual entities acting, in a mass, as a solid- or a liquid-containing free-flowing powder, the dewatering of capsule walls facilitates and accelerates capsule wall drying; (2) in the manufacture of capsule-supplied paper products, the use of capsules whose walls have been dewatered permits a faster production rate by virtue of the decreased time required for drying the encapsulated components of a paper coating or furnish. The two above-mentioned benefits of capsules whose walls have been dewatered by the novel treatment, find importance in economic considerations derived from increased production rate with a given system of equipment. The following three uses for the novel treatment pertain to improved product quality: (1) The sulfosuccinate and phosphate ester treatment materials act, in some ways, as surfactants and lend hydrophobic characteristics to the capsule walls, thus reducing the tendency for capsule agglomeration during drying and isolation steps of capsule manufacture. (2) The novel dewatering treatment is reversible and yet possesses some of the insolubilizing attributes of chemical cross-linking associated with gelatin-containing materials. Capsules can, therefore, be dewatered, efficiently dried and isolated, and the capsule walls can then be made to re-assume water solubility when dispersed in an aqueous system above a certain critical pH. (3) For reasons not entirely understood, a capsule wall which has been dewatered by the novel treatment prior to drying and isolation is more impervious to loss of capsule contents by diffusion through the wall than capsules which have not undergone the dewatering treatment.

U.S. Pat. No. 3,494,872 issued Feb. 10, 1970 on application of Theodore Maierson et al. discloses processes for manufacturing minute capsules and for dewatering capsule walls in aqueous vehicles. However, the treatment material disclosed to be eligible for use therein was limited to sulfonic acids and sulfonates.

A specific object of the present invention is to provide a method for preparing, en masse, minute capsules by a technique of forming a separated phase of potential capsule-wall-forming material by means of a complexing reaction between a sulfosuccinate compound and gelatin or an organic phosphate ester compound and gelatin in an aqueous manufacturing vehicle and then causing said separated phase to encase intended capsule core entities. A further object of this invention is to provide a method for treating such capsules prior to drying the walls to form individual capsule entities having the appearance of a free-flowing, powder-like, material and having capsule walls which demonstrate improved physical characteristics.

A still further object of this invention is to provide a method for treating water-swollen already-formed gelatin-containing capsule walls, made by any method, in an aqueous slurry in such a manner as to cause much of the absorbed water to be excluded from the capsule wall.

A further object of this invention is to provide a method for subsequently dewatering the walls of capsules which have been prepared by the phase separation technique of this invention, said dewatering requiring only a change in the conditions of the system from those conditions necessary to accomplish the phase separation.

With these and other objects in mind, the invention will now be fully disclosed, from which disclosure other useful objects which are inherent in the scope of this invention will be apparent to one skilled in the art.

SUMMARY OF THE INVENTION

Novelty in the present invention resides in establishment of correct and appropriate conditions to conduct the reaction between sulfosuccinate materials or organic phosphate ester materials and gelatin in order that the product of the reaction between those materials and gelatin in aqueous solution forms a second, water-containing, coacervate liquid phase in equilibrium with a continuous liquid phase dilute in gelatin and those materials.

The phase separation and encapsulation process of this invention is similar, in some respects, to the process of the previously referenced U.S. patent to Green et al., in which two hydrophilic polymeric materials are employed, each material having an electrical charge opposite that of the other wherein the materials are reversibly combined by virtue of the forces associated with their opposite electrical charge characteristics. In the phase separation of the Green et al. patent, two oppositely-charged polymeric materials are utilized, but in the subject invention only one of the materials is polymeric.

The novel dewatering process of the present invention is also a direct result of a complexing reaction, carried nearer to completion and requiring only a slight pH alteration from the conditions required for the coacervate phase separation.

The capsules prepared by the process of this invention can be varied in size from about 1 to 2 microns up to 5,000 microns or perhaps larger, the size depending upon encapsulation conditions, which conditions may be adjusted in accord with the capsule product requirements. Any substantially water-insoluble solid or liquid material can be encapsuled by the process of this invention provided that it does not react, under encapsulating conditions, with either the gelatin or the sulfosuccinate or organic phosphate ester materials and provided it will be wetted by the coacervate. Examples of a few of the materials which are eligible for encapsulation and subsequent capsule wall treatment by the novel method include: volatile non-polar solvents such as toluene, xylene, and cyclohexane; relatively non-volatile liquids such as silicone oils and halogenated hydrocarbons; and solids such as pigments, minerals, and water-insoluble organic materials. As an additional feature of this invention, preformed capsules prepared by encapsulation methods other than sulfosuccinate- or phosphate ester-induced phase separation can also be treated with the sulfosuccinate or phosphate ester materials. Any water-swollen capsule wall which contains gelatin as a wall component can be dewatered by the subject process.

Sulfosuccinate materials which are eligible for use in practice of the present invention include alkali sulfosuccinate esters of fatty acid alkanolamides and alkyl and dialkyl sulfosuccinates wherein "alkyl" represents a saturated hydrocarbon group containing from 2 to 24 carbon atoms. An example of such material is sodium sulfosuccinate myristamide.

Phosphate ester materials which are eligible for use in practice of this invention include organic phosphate esters, phosphate diesters and complex phosphate ester salts of hydroxyl-terminated aliphatic and aromatic alkoxide condensates. An example of such material is represented by the structural formula:

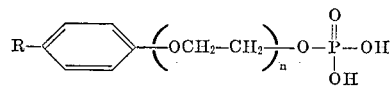

wherein R is alkyl, for example, octyl or nonyl, and $n$ is 1 to 40. Other sulfosuccinate and phosphate ester materials which operate equivalently in the practice of this invention, if otherwise eligible, are considered as falling within the scope of the invention. The various sulfosuccinates and organic phosphate esters disclosed herein to be eligible for use in this invention, demonstrate a general applicability of sulfosuccinate compounds and phosphate ester compounds to the liquid phase separation and dewatering treatment of gelatin initially in water solution.

Having been disclosed in a general manner, specific embodiments of the invention will now be described with respect to the novel encapsulation process and the capsule wall dewatering treatment. It will be apparent to those skilled in the art that the examples, by their diversified nature, are intended to demonstrate the broad scope of the invention rather than limit it in any way.

DESCRIPTION OF PREFERRED EMBODIMENTS

Example I.—Into a one-liter vessel equipped for heating and agitation are placed 20 grams of an organic phosphate ester such as that material sold under the trademark "QS–44" by Rhom & Haas Company, Philadelphia, Pa., U.S.A., and 550 grams of water. The phosphate ester is of the alkyl aryl alkoxide condensate variety hereinabove disclosed by structural formula. This mixture is stirred and warmed to effect solution, after which the system pH is 2.0. To the warmed (40 to 45 degrees centigrade) phosphate ester system is added 180 milliliters of an 11 percent, by weight, gelatin (isoelectric point, pH 8 to 9; Bloom strength, 285 to 305 grams) solution also at a temperature of 40 to 45 degrees centigrade, thus increasing the system pH, in this experiment, to about 4.8. After addition of the gelatin solution, a stringy, semi-liquid, phase of gelatin solution emerges from the liquid system, which emergent phase is changed into a mobile liquid phase by adjusting the pH to 4.2. While the system is maintained at a temperature of 40 to 45 degrees centigrade, 250 milliliters of d-limonene (the capsule internal phase for this example) is added to the two-phase system, and the rate of agitation is adjusted to yield d-limonene droplets 100 to 300 microns in diameter. The heating source is turned off, and agitation is continued until, after about three hours, the system has cooled to nearly room temperature. During the cooling, the emergent separated phase, high in gelatin content, begins to wrap around and encase the d-limonene droplets at about 37 degrees centigrade. At about 28 degrees centigrade, substantially all of the separated phase has been collected by the d-limonene droplets to form embryonic capsule walls. The pH of the stirred system is then adjusted to 3.0 and the system is allowed to continue stirring for about an additional fifteen minutes to complete the dewatering reaction. This adjustment, which represents the dewatering treatment of this invention, causes the capsule walls to contract to about one tenth of their original thickness.

Example II.—In this example, substantially the same encapsulation process is used except that the system is much higher in concentration of capsule-making materials, thus demonstrating the versatility of this process.

Into a one-liter vessel equipped for heating and agitation are placed 20 grams of the phosphate ester of Example I and only 200 grams of warm water. This mixture is stirred to effect solution. To the warmed (40 to 45 degrees centigrade) phosphate ester system is added 180 milliliters of an 11 percent, by weight, gelatin (as in Example I) solution, also at a temperature of 40 to 45 degrees centigrade. The pH of the system after addition of the gelatin solution is about 4.8, and the emergent, semiliquid, second phase is transformed into a mobile, fluid phase by adjustment of the pH to about 4.2. The internal phase used in this example is a dye solution comprising crystal violet lactone in a carrier liquid of chlorinated biphenyl having a specific gravity of about 1.35, which dye solution is used in encapsulated form in the coating of various paper products. Two hundred and fifty milliliters of said liquid dye solution is added to the heated system, and agitation is adjusted to yield a dispersion of droplets of the dye solution having a diameter of about 25 microns. While agitation is maintained, the system is permitted to cool as in Example I, and, when about 28 degrees centigrade is reached, the system pH is adjusted to 3.0, thus shrinking the water-swollen capsule walls. The capsules are now ready for coating onto paper, which coating operation is accomplished in the laboratory with a drawdown applicator.

It should be pointed out at this time that Examples I and II demonstrate the great latitude in the concentration of materials eligible for use in the total system of this encapsulation process. The concentrations used in said two examples are not limiting values but merely present two systems which operate with good results. The relative concentration parameters of this encapsulation process are generally described in terms of (a) percent of gelatin, by weight, in the total system, and (b) ratio of sulfosuccinate or organic phosphate ester material to gelatin material in the system. The concentration range for gelatin in the present encapsulation system has been found to extend from very dilute up to the point where difficulties are encountered due to premature gelation of the manufacturing vehicle. The gelatin concentration range for preferred operation is from about 1 to 5 percent, by weight, of the total system weight, with the limits for operation extending down to about ¼ percent or perhaps lower and up to about 10 percent. The ratio, by weight, of sulfosuccinate or organic phosphate ester material to gelatin can range from about 1 to 4 to about 2 to 1, depending upon the individual material and upon encapsulation conditions, such as pH, stirring rate, and temperature. Careful adjustment of system parameters may permit a wider range of sulfosuccinate-to-gelatin and phosphate ester-to-gelatin ratios, but operation within the given limits are generally preferred.

Example III.—In this example, already-formed capsules are treated in the manufacturing vehicle to shrink the capsule walls prior to drying. Such a treatment of already-formed capsules is useful in improving the physical characteristics of the capsule wall and in hastening the normal capsule-drying operations. The capsules are prepared by adding 250 milliliters of soya bean oil to a vessel containing 20 grams each of gum arabic and gelatin in agitating solution in 1,020 milliliters of water, which solution is maintained at 40 degrees centigrade, with the pH adjusted to 4.5 to initiate the emergency of a coacervate. The agitated system is slowly cooled to about 25 degrees centigrade to complete the formation of capsules and is chilled to about 10 degrees centigrade to gel the capsule walls. Ten milliliters of 25 percent, by weight, aqueous pentanedial is added to harden the capsule walls. The system is permitted to stir for about sixteen hours while slowly returning to room temperature after which time the capsules are ready for the dewatering treatment. Two hundred milliliters of 10 percent, by weight, aqueous myristamide sodium sulfosuccinate solution (as sold under the trademark "Emcol 4100M" by Witco Chemical Co., Inc., New York, N.Y., United States of America), having an adjusted pH of 4.0 to 4.2 is added to the capsule-containing system, and the system is stirred for two to four hours after the pH adjustment.

Example IV.—This example demonstrates the dewatering feature of the present invention by a treatment of the capsules manufactured in Example III, above. In this example, the myristamide sodium sulfosuccinate is replaced by 20 grams of 60 percent, by weight, aqueous solution of dioctyl sulfosuccinate (as sold under the trademark "Triton GR–5" by Rohm and Haas Company). Techniques, parameters and results of this example are substantially the same as those in preceding Example III.

Example V.—In this example, minute capsules, which have been previously dried and are in the form of free-flowing soy bean oil-containing spheres having diameters of about 200 to 800 microns, are treated by the process of this invention. The capsules contain about 90 percent, by weight, soy bean oil, and the capsule walls comprise gum arabic, gelatin, and two different poly(ethylene-co-maleic anhydride) materials having molecular weights of 1,000 to 2,000 and 60,000 to 70,000.

Two hundred grams of the capsules are dispersed in about 1,000 grams of water, and, after stirring for about fifteen minutes, 200 grams of an organic phosphate ester treatment material (such as the material sold by Witco Chemical Co. under the trademark of "Emcol 142"), is dissolved in the water, and the pH is adjusted to 4.0 to 4.2, as in Example III. The same reaction parameters from Example III apply to this example. Chemical hardening of capsules which are to be treated by this method is an optional process step which can be used if desired, but is not necessary. The phosphate ester of this example is a nonyl phenyl alkoxide condensate monoester wherein there are about 9.5 moles of ethoxide in each molecule.

Example VI.—This example (a) demonstrates an encapsulation of a solid material, (b) demonstrates the use of a weight ratio of sulfosuccinate material to gelatin different from prior examples, and (c) includes the optional chemical hardening step after sulfosuccinate capsule-wall-shrinking treatment.

Twenty grams of an alkyl sulfosuccinate (such as that material sold under the trademark of "AL 40–3" by Witco Chemical Co.) are dissolved in about 350 milliliters of warm water (about 40 degrees centigrade), and the warm solution is added to a vessel which contains 180 milliliters of an 11 percent, by weight, aqueous gelatin (quality as in Example I) solution, also warmed to about 40 degrees centigrade. This mixture is stirred, and the pH is adjusted to 3.9. A fluid, separated, coacervate phase is now present in the system for use as capsule wall material. While the agitation is maintained, 50 grams of silicon dioxide, having an average particle size of about 100 microns, is added to the system to serve as an experimental capsule internal phase and globules of the coacervate phase wet and enwrap the silicon dioxide particles. The agitated system is permitted to cool to cause formation of capsule walls, and, at a temperature of about 28 degrees centigrade, the pH is changed to 3.5 to shrink the capsule walls. After about fifteen minutes, the system is chilled to nearly 10 degrees centigrade, and 10 milliliters of a 25 percent, by weight, aqueous pentanedial solution is added to chemically harden the capsule walls. The system is permitted to stir for about sixteen hours, during which time the temperature slowly rises to ambient.

What is claimed is:

1. A method for preparing, en masse, minute capsules having walls which comprise the product of reaction between gelatin and a water-soluble, sulfosuccinate or organic phosphate ester material taken from the group consisting of sulfosuccinate esters of fatty acid alkanolamides and alkyl and dialkyl sulfosuccinates wherein "alkyl" represents a saturated hydrocarbon group containing 2 to 24 carbon atoms, and phosphate ester salts of hydroxyl-terminated aliphatic and aromatic alkoxide condensates, wherein the ratio, by weight, of gelatin to sulfosuccinate or phosphate material is from about 1 to 2 to about 4 to 1, including the steps of:

(a) establishing an agitated aqueous system comprising ¼ to 10 percent, by weight, of said product of reaction material;

(b) adjusting the pH and the temperature of the so-established system to provide mobile, fluid, particles dispersed, as a discontinuous phase of said product of reaction, in the residual aqueous manufacturing vehicle, the residual aqueous vehicle being now lower in gelatin concentration;

(c) adding to the so-established system the intended capsule core entity material; and (d) cooling said system to cause the dispersed phase, which is high in gelatin concentration, to encase the intended capsule core entities to form water-swollen capsule walls.

2. The method of claim 1 wherein steps (b) and (c) are reversed.

3. The method of claim 1 with the added step of:
(e) adjusting the pH of the capsule-containing system to cause the water-swollen capsule walls to densify by virtue of a dewatering of the capsule walls.

4. The method of claim 2 with the added step of:
(e) adjusting the pH of the capsule-containing system to cause the water-swollen capsule walls to densify by virtue of a dewatering of said capsule walls.

5. The process of dewatering, en masse, water-swollen gelatin-containing walls of minute capsules by the steps of:

(a) establishing an agitated aqueous system of water-swollen gelatin-walled capsules;

(b) adding to said dispersion water-soluble, sulfosuccinate or organic phosphate ester material taken from the group consisting of sulfosuccinate esters of fatty acid alkanolamides and alkyl and dialkyl sulfosuccinates wherein "alkyl" represents a saturated hydrocarbon group containing 2 to 24 carbon atoms and phosphate ester salts of hydroxyl-terminated aliphatic and aromatic alkoxide condensates wherein the ratio, by weight, of gelatin to the added sulfosuccinate or phosphate material is from about 1 to 2 to about 4 to 1; and (c) adjusting the system pH to about 4.4 to about 2.0; the point where the capsule walls are shrunk by virtue of a densifying of said capsule walls.

References Cited
UNITED STATES PATENTS

| | | | |
|---|---|---|---|
| 3,494,872 | 2/1970 | Maierson et al. | 252—316 |
| 2,525,753 | 10/1950 | Yutzy et al. | 260—117 |
| 2,925,365 | 2/1960 | Nicholson et al. | 424—37 X |
| 3,364,044 | 1/1968 | Grabhöfer et al. | 260—117 X |

RICHARD D. LOVERING, Primary Examiner

U.S. Cl. X.R.

106—308 P; 117—100 A, 100 B, 100 S; 264—4